United States Patent
Eiselt et al.

(10) Patent No.: US 7,054,143 B2
(45) Date of Patent: May 30, 2006

(54) ELECTRICAL INSTALLATION COMPRISING A DECOMPRESSION CHANNEL

(75) Inventors: Martin Eiselt, Gründau (DE); Gildo Mahn, Linsengericht (DE); Achim Milbich, Waghaeusel (DE)

(73) Assignee: Siemens Aktiengellschaft, Munich (DE)

( * ) Notice: Subject to any disclaimer, the term of this patent is extended or adjusted under 35 U.S.C. 154(b) by 83 days.

(21) Appl. No.: 10/472,597

(22) PCT Filed: Mar. 11, 2002

(86) PCT No.: PCT/DE02/00933

§ 371 (c)(1),
(2), (4) Date: Sep. 22, 2003

(87) PCT Pub. No.: WO02/075884

PCT Pub. Date: Sep. 26, 2002

(65) Prior Publication Data

US 2004/0114289 A1     Jun. 17, 2004

(30) Foreign Application Priority Data

Mar. 20, 2001  (DM) ............................. 101 14 742

(51) Int. Cl.
*H02B 7/06* (2006.01)
*H02B 1/26* (2006.01)

(52) U.S. Cl. ...................... 361/605; 361/611; 361/624; 361/675; 361/678; 218/155; 218/157

(58) Field of Classification Search ........ 361/601–603, 361/605, 611, 619–621, 623–626, 675–678, 361/688–690; 312/236; 200/50.21–50.27, 200/306; 218/155, 157
See application file for complete search history.

(56) References Cited

U.S. PATENT DOCUMENTS

| | | | | | |
|---|---|---|---|---|---|
| 2,501,345 | A | * | 3/1950 | Macneill et al | 361/604 |
| 4,118,755 | A | * | 10/1978 | Davies et al. | 361/678 |
| 5,124,881 | A | * | 6/1992 | Motoki | 361/605 |
| 5,193,049 | A | * | 3/1993 | Jackson | 361/676 |
| 5,689,097 | A | * | 11/1997 | Aufermann et al. | 218/157 |
| 5,710,402 | A | * | 1/1998 | Karnbach et al. | 218/157 |
| 5,892,195 | A | * | 4/1999 | Aufermann et al. | 218/157 |
| 6,365,826 | B1 | * | 4/2002 | Stendardo et al. | 174/17 VA |
| 6,407,331 | B1 | * | 6/2002 | Smith et al. | 174/50 |
| 6,433,998 | B1 | * | 8/2002 | Arioka et al. | 361/606 |

FOREIGN PATENT DOCUMENTS

| | | | |
|---|---|---|---|
| DE | 91 02 514 | | 7/1881 |
| DE | 2919434 | A * | 11/1980 |
| DE | 31 10 951 | | 8/1982 |

(Continued)

*Primary Examiner*—Anatoly Vortman
(74) *Attorney, Agent, or Firm*—Morrison & Foerster LLP

(57) ABSTRACT

The invention relates to an electrical installation, especially a medium-voltage switchgear, comprising at least one encapsulated function module (FM), a decompression channel (DK) which is connected to said function module, and at least one inflow opening (EO . . . ) which connects the function module (FM) to the decompression channel (DK). The covering surface (DF 1,2,3) of the decompression channel (DK), opposite the inflow opening (EO . . . ), comprises at least one partial region which is obliquely oriented in relation to the inflow direction. Hot gases and high pressures produced during an accidental arc can thus be evacuated from the installation, without any risk to humans and buildings. Pressure channels are used, inter alia, in installations used in relation to medium-voltage technique for providing and distributing energy.

6 Claims, 3 Drawing Sheets

FOREIGN PATENT DOCUMENTS

| | | |
|---|---|---|
| DE | 31 25 364 | 1/1983 |
| DE | 3525143 A1 * | 1/1987 |
| DE | 4220790 A1 * | 1/1994 |
| DE | 195 20 698 | 10/1997 |
| DE | 196 45 304 | 10/1997 |
| EP | 268137 A * | 5/1988 |
| JP | 02032706 A * | 2/1990 |
| JP | 10322811 A * | 12/1998 |

* cited by examiner

ELECTRICAL INSTALLATION COMPRISING A DECOMPRESSION CHANNEL

CLAIM FOR PRIORITY

This application is a national stage application of PCT/DE02/00933, which was published on Mar. 11, 2002, which claims the benefit of priority to German Application No. 10114742.2, filed Mar. 20, 2001.

TECHNICAL FIELD OF THE INVENTION

The invention relates to an electrical installation, and in particular to a medium-voltage switchgear assembly.

BACKGROUND OF THE INVENTION

For the protection of persons and of the installation, medium-voltage switchgear assemblies are provided with apparatuses for releasing pressure in order for it to be possible for the hot gases produced in the event of an arc flashover to be dissipated safety from the installation area. A number of functional modules are usually used for these switchgear assemblies, the functional modules being encapsulated with respect to one another and with respect to the atmosphere such that the effects of an explosion in the interior of the functional module cannot spread to the area surrounding the installation. In the event of an arc forming in one of these functional modules, the excess pressure produced by the air suddenly being heated and the hot gases are dissipated such that neither persons nor the installation are harmed or damaged in any way. Pressure release ducts are usually provided for this purpose and are connected to the individual functional modules by means of a suitable valve system such that it is possible for the excess pressure and the hot gases to be dissipated from the affected functional module but at the same time such that it is not possible for the hot gases or a pressure wave to enter the other functional modules.

DE 31 25 364 A1 describes a pressure release duct which is rectangular in cross section and in whose interior the hot gases are first cooled by swirling and the excess pressure is reduced. Then, the gases are dissipated from the installation via ventilation slots such that they are thereafter only slightly harmful.

In DE 195 20 698 A1 and DE 196 45 304 C1, the pressure and temperature are reduced using so-called damping elements, in the form of cartridges, which are installed either within the installation or externally. The gases are in this case directed away either via ventilation slots into the area of the building surrounding the installation or to the outside via a chimney system.

With all of these solutions it is possible, however, for the pressure release duct having a rectangular cross section not to be suitable for loads in the case of particularly intensive arc flashovers.

SUMMARY OF THE INVENTION

The invention discloses dissipation of the high pressures and temperatures which occur during an arc discharge without posing a risk to persons and the installation, and to ensuring sufficient robustness even for the case of intensive arc discharges and their effects.

In one embodiment of the invention, the top surface, which is opposite the inflow opening, of the pressure release duct has at least one subarea which is aligned obliquely with respect to the inflow direction. Obliquely is understood here to mean any deviation from a right angle in comparison to the flow direction, which results in the gas not being reflected exactly straight.

The advantages achieved by the invention are, firstly, that the cross-sectional form described has greater static robustness than the rectangular cross-sectional form since the cross-sectional form described can be as close as desired to a round cross-sectional form which is optimum for robustness. Optimum robustness is achieved by the cross section having as few straight surface areas as possible which can be susceptible to bending. Secondly, the advantage of the design according to the invention is that the pressure wave entering the pressure release duct through the inlet opening is scattered on the cover surface which is opposite the inlet opening by being reflected in different directions. In this manner, extreme pressure peaks can largely be ruled out by superimposing other pressure waves on them.

One advantageous embodiment of the invention provides for the pressure release duct to have a trapezoidal cross-sectional profile. The refinement in which the cross-sectional surface has a trapezoidal form firstly provides great robustness and, secondly, makes simple manufacture possible.

A further advantageous embodiment of the invention provides for the pressure release duct to have sloped end regions. By this means, the pressure wave which propagates in the longitudinal direction of the pressure release duct is scattered and the pressure peaks are leveled off.

A further advantageous embodiment of the invention is that the top surface of the pressure release duct has at least one sloping surface approximately opposite the inflow opening in the inflow direction.

In this manner, the pressure wave entering the pressure release duct through the inflow opening can be dispersed and thus weakened right at the start.

A further advantageous embodiment of the invention provides for the pressure release duct to have a pressure release opening to the exterior of the installation. The pressure wave and the gases produced are in this case either dissipated into a pressure- and temperature-resistant area, in which there are no people, or are directed outside via a chimney system. In this manner, reliable dissipation is ensured without posing any risk to the installation or people.

A further advantageous embodiment of the invention is for the pressure release duct to be connected to the exterior of the installation via an absorption element. The absorption element reduces both the temperature and the pressure to such an extent that the gases can be dissipated both into a pressure- and temperature-resistant area or via a chimney system to the outside and into the area directly surrounding the installation.

A further advantageous embodiment of the installation provides for the pressure release duct to have ventilation openings on its top surface which close in a pressure-tight manner in the event of a pressure surge occurring in the pressure release duct. This ensures that sufficient cooling air is dissipated from the installation for normal operation of the installation. In the event of an arc flashover with the occurrence of hot gases and high pressures, the ventilation openings are closed by means of valves and prevent the gases from escaping into the area surrounding the installation.

BRIEF DESCRIPTION OF THE DRAWINGS

The invention is explained in more detail by exemplary embodiments depicted in the figures. The invention is described in more detail below.

In the drawings.

DETAILED DESCRIPTION OF THE INVENTION

Figure 1:
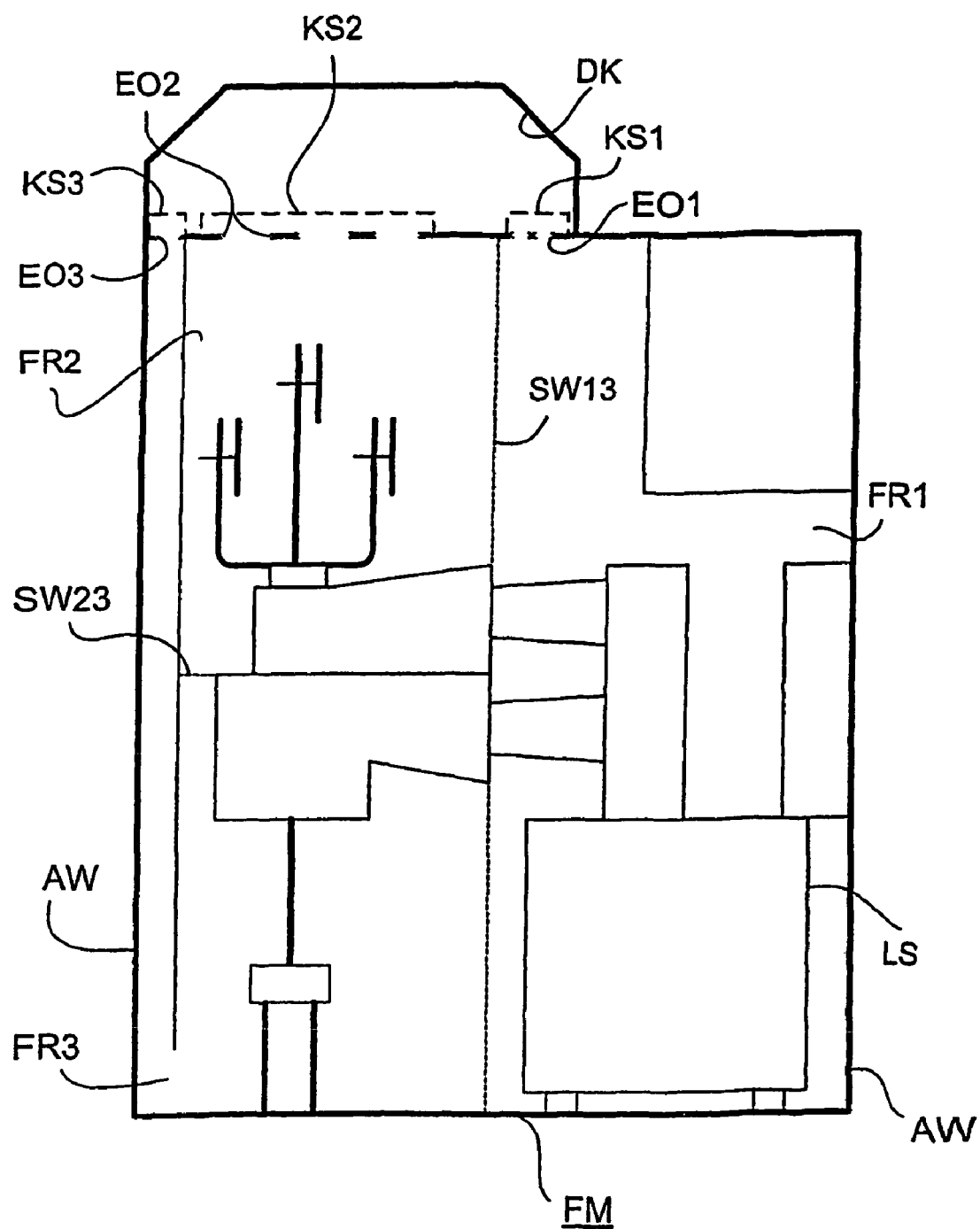
FIG. 1 shows a view of the cross section through a functional module with a pressure release duct having a trapezoidal cross section placed on top.

The functional module FM shown in FIG. 1 is divided up into a plurality of functional compartments FR 1, 2, 3. These compartments are separated from one another in a gas-permeable manner by partition walls SW 13, 23. In other designs, the partition walls SW . . . can also separate the individual functional compartments FR . . . from one another in a pressure-tight manner. The individual functional compartments FR . . . may be, for example, switching module compartments FR 1 having power breakers LS, connection compartments FR 3 or busbar compartments FR 2. The outer walls AW of the functional module FM shown are closed off in a pressure-tight manner both from the area surrounding the installation and from any further functional modules FM . . . which may be adjacent. In the exemplary embodiment shown, the inlet openings EO 1, 2, 3 to the pressure release duct DK are on the top face of the functional module FM. In this case, each functional compartment FR 1, 2, 3 has its own connection to the pressure release duct DK such that a fault in one of the functional compartments FR 1, 2, 3 does not have any effect on the other functional compartments FR 1, 2, 3. The inlet openings EO 1, 2, 3 to the pressure release duct DK are closed in the exemplary embodiment shown by valve systems KS 1, 2, 3 having a non-return valve function such that gas can only flow from the functional module FM, and not from the pressure release duct DK into the functional module FM.

Figure 2:
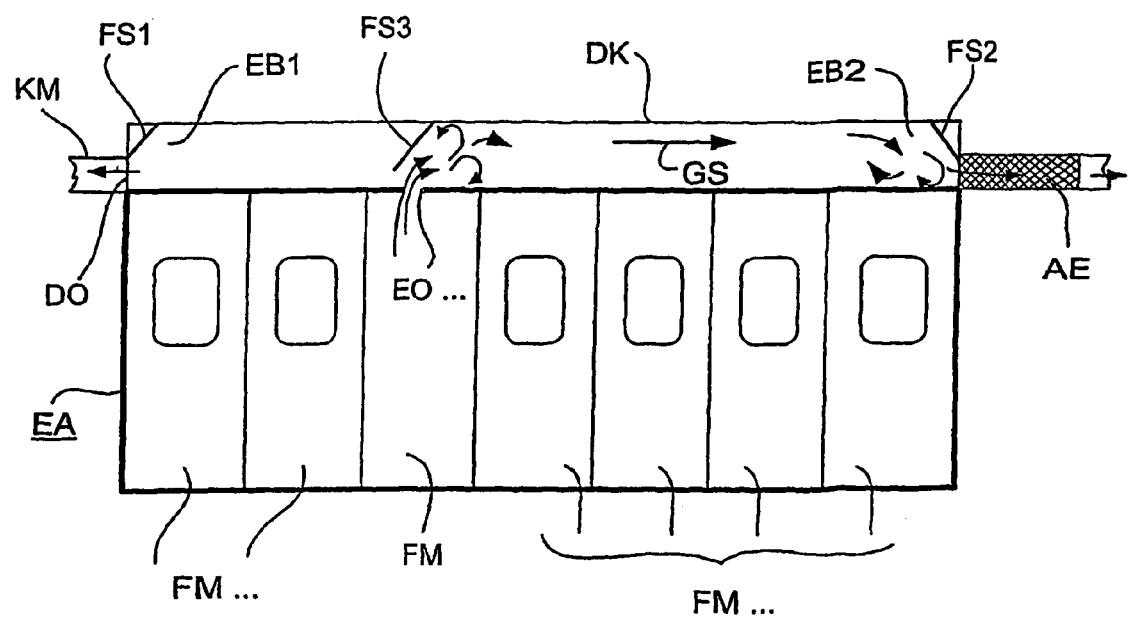
FIG. 2 shows a view of a plurality of adjoining functional modules having a common pressure release duct.

FIG. 2 shows, schematically and in longitudinal section, a plurality of adjoining functional modules FM, FM . . . having a common pressure release duct DK in the longitudinal direction. If an arc flashover now occurs in a functional module FM, the air in this functional module FM is supplied with a large amount of heat causing it to expand explosively. The pressure wave produced can then be dissipated via the valve system KS 1, 2, 3 (in FIG. 1) into the pressure release duct DK but cannot spread to other functional modules FM . . . owing to the non-return valve function of the valve system KS 1, 2, 3. On the top surfaces DF 1, 2, 3 (in FIG. 3) opposite the inlet openings EO . . . in the pressure release duct DK, the pressure wave is scattered in more than one direction and the maximum pressure is thus reduced. This process takes place more than once while the pressure wave spreads in the longitudinal direction of the pressure duct DK, with the result that the pressure peak can be safely reduced. In addition, surfaces sloping FS 1, 2, 3 are shown in the longitudinal direction above the inflow openings EO . . . , provided on each individual functional module FM, FM . . . , and on the end regions EB1, 2 of the pressure release duct DK, and these surfaces cause the pressure wave to be scattered further, and thus cause the pressure peaks to be reduced. The swirling of the gases in the pressure release duct DK causes both the pressure and the temperature to be reduced dramatically. In order to finally dissipate the gases, the pressure release duct DK can be connected to a chimney system KM or coupled to an absorption element AE, with the pressure and the temperature being reduced to such an extent that the gases can be safely dissipated onto the area surrounding the installation. Absorption elements AE usually comprise chambers filled with a filling material, for example metal chips, in which the gases are heavily scattered, swirled, cooled and neutralized. The dissipation of heat takes place through heat conduction and possibly also melting processes of the filling material. Instead of the loose filling material, metal sheets which are arranged offset in relation to one another may also be used to cool and swirl the flow, with it also being possible for the metal sheets to have distributed openings. Furthermore, the arrows are also indicated a possible course for the flow of gas GS in the pressure release duct DK. In particular, the swirling areas can be seen on the sloping surfaces FS 2, 3.

Figure 3:
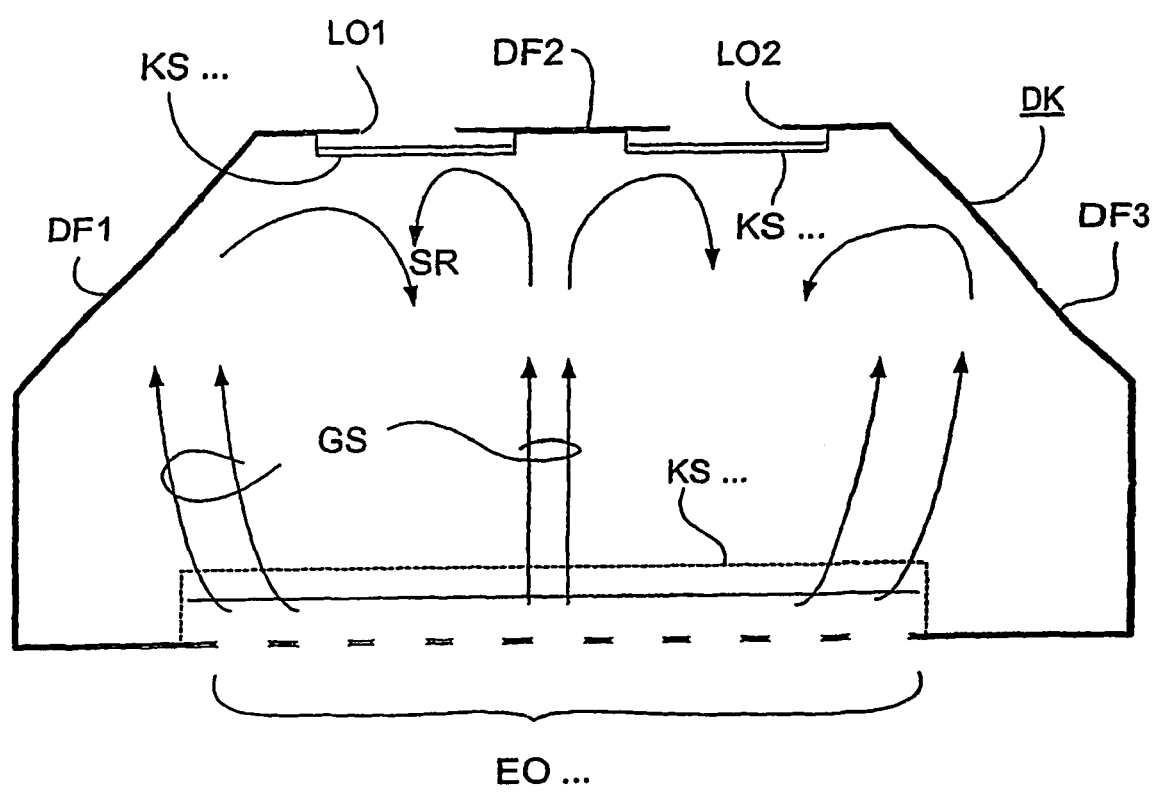
FIG. 3 shows a view of the cross section through a pressure release duct having a trapezoidal cross section.

FIG. 3 shows an enlarged illustration of the pressure release duct DK having a trapezoidal cross section as an exemplary embodiment of the invention. In addition to trapezoidal cross sections, for example cross sections in the form of semi-circles or other polygonal forms may also be provided according to the invention.

The inlet openings EO . . . having the valve systems KS can be seen. These are, for example, loose valves on the inlet openings EO . . . , which are opened by the pressure wave, thus allowing the flow of gas GS into the pressure release duct DK. Some of the inlet openings EO . . . are opposite sloping cover surfaces DF 1, 2, 3, which reflect the incoming hot gases in different directions and thus dissipate them so that the pressure peaks can be reduced. A course for the flow directions SR of the gas which is possible owing to the swirling is depicted. Also shown are the ventilation openings LO 1, 2 which are provided on the cover surface DF 1, 2, 3 of the pressure release duct DK and are closed in a pressure-tight manner by means of the valve system KS . . . in the event of a pressure surge in the pressure release duct DK.

What is claimed is:

1. An electrical installation, in particular a medium voltage switchgear assembly comprising:
    at least one encapsulated functional module and a pressure release duct connected thereto;
    at least one inflow opening which connects the functional module to the pressure release duct, a top surface, which is opposite the inflow opening, of the pressure release duct having at least one subarea which is aligned obliquely with respect to the inflow direction, wherein the pressure release duct has ventilation openings on the top surface, which close in a pressure-tight manner in an event of a pressure surge occurring in the pressure release duct.

2. The electrical installation as claimed in claim 1, wherein the pressure release duct has a trapezoidal cross-sectional profile.

3. The electrical installation as claimed in claim 1, wherein the pressure release duct has sloping end regions.

4. The electrical installation as claimed in claim 1, wherein the top surface of the pressure release duct has at least one sloping surface approximately opposite the inflow opening in the inflow direction.

5. The electrical installation as claimed in claim 1, wherein the pressure release duct has a pressure release opening to an exterior of the installation.

6. The electrical installation as claimed in claim 1, wherein the pressure release duct is connected to the exterior of the installation via an absorption element.

* * * * *